United States Patent
Kakiuchi et al.

(10) Patent No.: US 8,947,559 B2
(45) Date of Patent: Feb. 3, 2015

(54) RECORDER AND PLAYER

(75) Inventors: Kenji Kakiuchi, Osaka (JP); Fumio Takano, Osaka (JP); Takahide Akamatsu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 315 days.

(21) Appl. No.: 13/426,671

(22) Filed: Mar. 22, 2012

(65) Prior Publication Data

US 2012/0242843 A1 Sep. 27, 2012

(30) Foreign Application Priority Data

Mar. 25, 2011 (JP) ................................. 2011-067246

(51) Int. Cl.
- *H04N 5/232* (2006.01)
- *H04N 5/77* (2006.01)
- *H04N 9/806* (2006.01)
- *H04N 5/907* (2006.01)

(52) U.S. Cl.
CPC ............... *H04N 5/772* (2013.01); *H04N 9/806* (2013.01); *H04N 5/907* (2013.01)

USPC ...................................... 348/231.2; 348/231.4

(58) Field of Classification Search
USPC .................................. 348/207.1, 231.1–231.9
See application file for complete search history.

(56) References Cited

U.S. PATENT DOCUMENTS

| | | | | |
|---|---|---|---|---|
| 7,536,087 B2 * | 5/2009 | Um et al. | ...................... | 386/239 |
| 2002/0021361 A1 * | 2/2002 | Kitajima et al. | .............. | 348/232 |

FOREIGN PATENT DOCUMENTS

| | | | |
|---|---|---|---|
| JP | 06-276478 A | | 9/1994 |
| JP | 2001-069453 A | | 3/2001 |
| JP | 2004096582 A | * | 3/2004 |

\* cited by examiner

*Primary Examiner* — Roberto Velez
*Assistant Examiner* — Yih-Sien Kao
(74) *Attorney, Agent, or Firm* — Renner, Otto, Boisselle & Sklar, LLP

(57) ABSTRACT

A player according to the present disclosure includes: an interface that retrieves an audio file from a storage medium on which the audio file and a still picture file are stored; and a controller that retrieves a still picture file, which is selected by the file name of the audio file, from the storage medium and that reads audio and a still picture from the audio file and the still picture file, respectively.

8 Claims, 7 Drawing Sheets

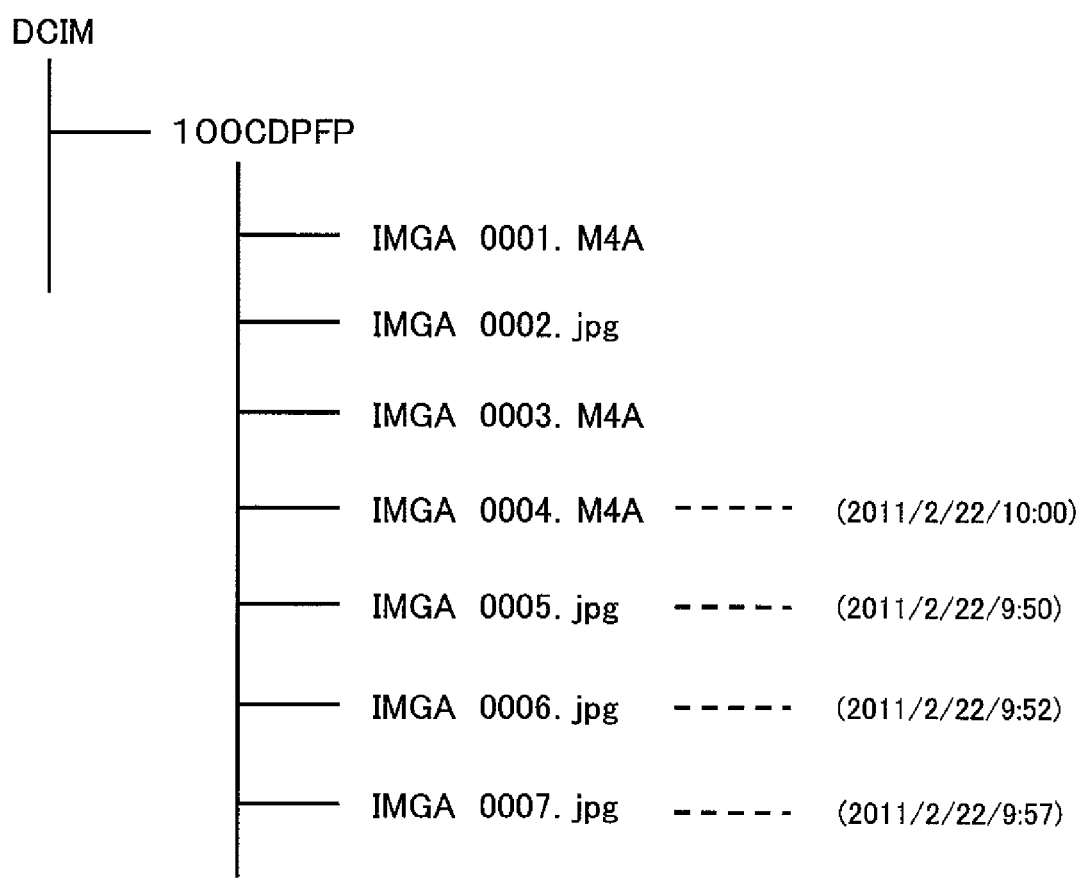

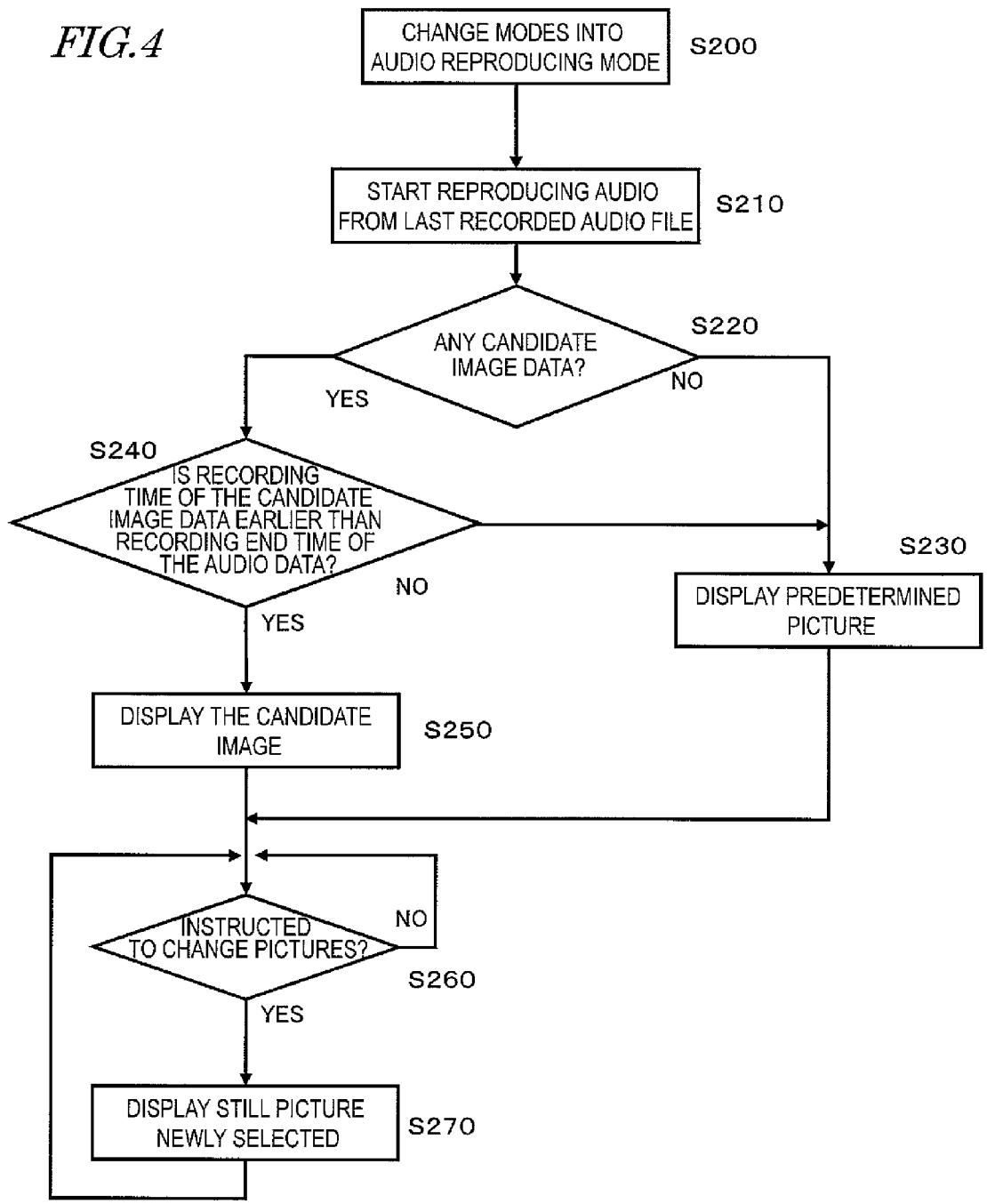

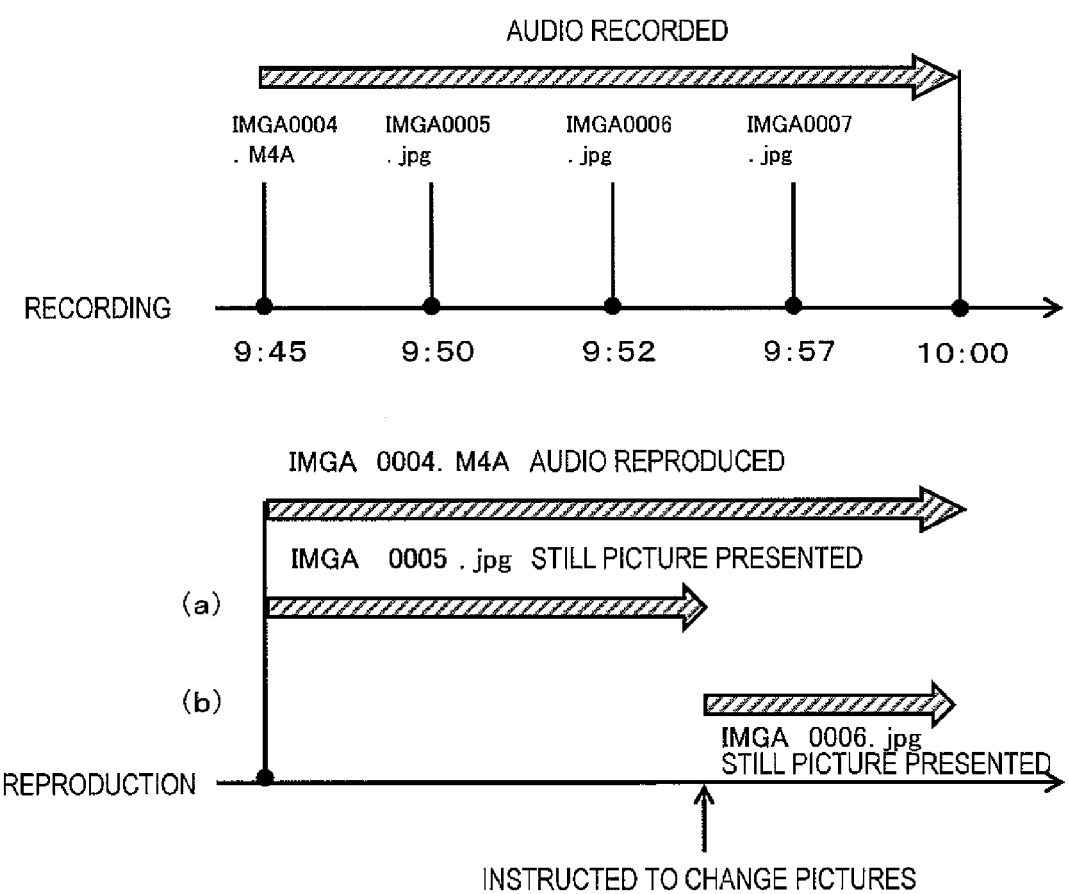

RECORDER AND PLAYER

BACKGROUND

1. Technical Field

The present application relates to a recorder and a player. More particularly, the present application relates to a recorder that records audio and a still picture and a player that plays back the recorded audio and still picture.

2. Description of the Related Art

Japanese Laid-Open Patent Publication No. 6-276478 discloses an audio and picture recorder/player. That recorder/player shoots a still picture and writes it on a storage medium while recording audio. In this case, the shooting time is a point in time when the still picture should be presented preferentially during the playback. When instructed to search for a still picture by the user while going to reproduce the audio recorded, this audio and picture recorder/player displays a list of still pictures that were recorded while the audio to be reproduced was recorded. On the other hand, unless instructed otherwise, this audio and picture recorder/player starts reproducing the audio instead. And when finding the reproducing time of the audio agreeing with the recording date and time of some still picture, the recorder/player also presents that still picture along with the audio being reproduced.

Japanese Laid-Open Patent Publication No. 2001-69453 also discloses an audio and picture recorder/player. When writing audio data and still picture data in a storage memory system, the recorder/player generates a still picture playback time management file for use to manage the time that has passed since audio started to be recorded. That still picture playback time management file describes the names of audio files, the names of still picture files, and their presentation times.

SUMMARY

A player according to one embodiment of the present disclosure includes: an interface configured to retrieve an audio file from a storage medium on which the audio file and a still picture file are stored; and a controller configured to retrieve a still picture file, which is selected by the file name of the audio file, from the storage medium and configured to reproduce audio and a still picture from the audio file and the still picture file, respectively.

The controller may retrieve, from the storage medium, a still picture file that was generated while the audio file was being generated.

The player may further include a user interface section that accepts a user's instruction to change the still pictures to be reproduced, and the controller may continue to reproduce the same still picture until the controller receives the instruction to change via the user interface section.

When receiving the instruction to change from the user via the user interface while reproducing the audio, the controller may reproduce a different still picture.

No matter whether the still picture file of the different still picture was generated or not while the audio file was being recorded, the controller may reproduce the different still picture.

If information indicating the order of recording has been added to the base name of a file that has been written on the storage medium and if a file system that allows the user to find the recording end time of the file is established on the storage medium, the controller may determine, by reference to the information and the recording end time of the audio file, what still picture file was recorded before the recording end time of the audio file.

If a file system that allows the user to find the recording end time of a file is established on the storage medium, the controller may retrieve, from the storage medium, a still picture file which was recorded before the recording end time of the audio file and of which the file name includes a part of the base name of the audio file.

The storage medium may be a memory card.

The storage medium may be a storage device that is connected to a network, and the interface may retrieve the audio file and the still picture file from the storage device.

The player may further include: a loudspeaker configured to output the audio; and a monitor screen configured to present the still picture.

The player may further include at least one of an audio signal generator configured to generate an audio signal and an image signal generator configured to generate an image signal representing a still picture.

A recorder according to one embodiment of the present disclosure includes: an audio signal generator configured to generate an audio signal; an image signal generator configured to generate an image signal representing a still picture; a processor configured to generate audio data and still picture data based on the audio signal and the image signal, respectively; and a controller configured to write the audio data and the still picture data as an audio file and as a still picture file, respectively, on the storage medium and configured to give the still picture file a file name associated with the file name of the audio file, if the still picture data is generated while the audio data is being generated.

The controller may add information indicating in what order the audio file and the still picture file were recorded on the storage medium to at least a part of the file name of each of the audio and still picture files.

The controller may give a file name that includes a part of the base name of the audio file to a still picture file that was recorded before the recording end time of the audio file.

The storage medium may be a memory card.

According to one embodiment of the present disclosure, even when not instructed by the user to search for any particular still picture file, the recorder/player can also visually and intuitively remind him or her when and where he or she recorded the audio data being reproduced now.

Other features, elements, processes, steps, characteristics and advantages of the present disclosure will become more apparent from the following detailed description of exemplary embodiments of the present disclosure with reference to the attached drawings.

BRIEF DESCRIPTION OF THE DRAWINGS

FIG. 3 schematically shows the directory structure in a memory card 200.

FIG. 4 is a flowchart showing how the digital camcorder 100 operates in an audio reproducing mode.

FIG. 6 is a schematic representation showing exactly how the read operation is carried out in the audio reproducing mode

DETAILED DESCRIPTION OF EMBODIMENTS

Figure 1:
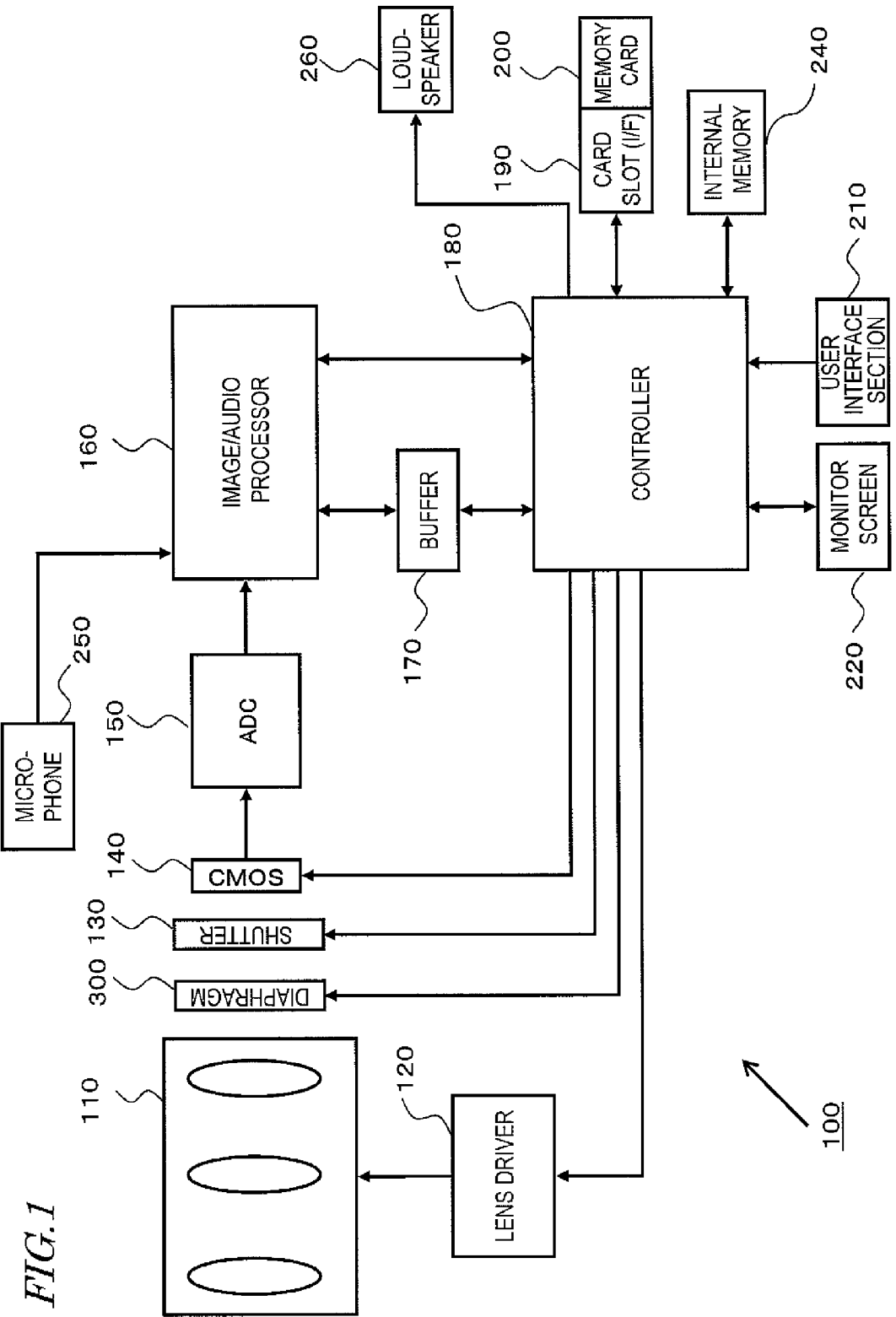
FIG. 1 is a block diagram illustrating a configuration for a digital camcorder 100.

The audio and picture recorder/player disclosed in Japanese Laid-Open Patent Publication No. 6-276478 does not present any still picture when starting to reproduce audio unless it is instructed by the user to search for a still picture. That is to say, in that audio and picture recorder/player, no still pictures are presented on its display section when the audio starts to be reproduced. With only the audio reproduced that way, it is difficult for the user to recall when and where he or she recorded that audio.

Meanwhile, the recorder/player disclosed in Japanese Laid-Open Patent Publication No. 2001-69453 must generate and record a management file. That is why if the management file were broken or deleted by the user, then neither the audio nor the still picture could be presented at the timing that was determined while they were recorded. Also, supposing a situation where audio and a still picture should be played back based on the data that is saved in a storage device on a network, there is no guarantee that such a management file is available from that storage device.

It is therefore an object of the present disclosure to provide a technique for reminding the user visually and intuitively when and where he or she recorded the audio data being reproduced now even without being instructed by the user to search for any particular still picture data or without using any management file.

Hereinafter, exemplary embodiments of a recorder and a player will be described with reference to the accompanying drawings. In the exemplary embodiment to be described below, a digital camcorder is implemented as a recorder/player according to the present disclosure.

1. Outline

The digital camcorder 100 of the present disclosure includes a microphone 250, and can generate audio data based on an audio signal that has been picked up by the microphone 250 and can write, as an audio file, the audio data thus generated on a memory card 200. In addition, while writing the audio data on the memory card 200, the digital camcorder 100 can also accept a user's instruction to shoot a still picture. When that happens, the digital camcorder 100 generates still picture data based on an image signal that has been captured by a CMOS image sensor 140, and writes, as a still picture file, the still picture data thus generated on the memory card 200. That is to say, while writing audio data on the memory card 200, the digital camcorder 100 can also write still picture data on the memory card 200, too.

Furthermore, while reproducing audio based on the audio data that is stored in the memory card 200, the digital camcorder 100 determines whether or not the memory card 200 stores any still picture data that was written while that audio data was being written. And if any such still picture data has been found in the memory card 200, then the digital camcorder 100 starts playing back that still picture and the audio synchronously with each other. As a result, even without giving the digital camcorder 100 a special instruction to search for any particular still picture, the user of this digital camcorder 100 can recall visually and intuitively when and where the audio being reproduced was recorded.

2. Configuration

Hereinafter, a hardware configuration for a digital camcorder 100 according to this exemplary embodiment will be described with reference to FIG. 1.

FIG. 1 is a block diagram illustrating a configuration for the digital camcorder 100.

This digital camcorder 100 is designed to make a CMOS image sensor 140 capture a subject image that has been produced by an optical system 110 including a single or multiple lenses. An image/audio processor 160 converts the image signal that has been generated by the CMOS image sensor 140 into digital data and subjects the digital data to various kinds of processing. And then a controller 180 stores, as an electronic file, the processed digital data in a memory card 200.

Hereinafter, the configuration of this digital camcorder 100 will be described in detail.

The optical system 110 of this digital camcorder 100 is made up of a zoom lens, a focus lens and other optical elements. The zoom lens is driven to move along the optical axis of the optical system and thereby zoom in on, or out, the subject image. The focus lens is driven to move along the optical axis of the optical system, thereby adjusting the focus position of the subject image.

A lens driver 120 drives various kinds of lenses that form the optical system 110, and includes a zoom motor that drives the zoom lens and a focus motor that drives the focus lens.

A diaphragm 300 adjusts the size of the aperture either in accordance with the user's setting or automatically, thereby adjusting the quantity of the light to pass through it.

A shutter 130 is a means for cutting the light to be transmitted to the CMOS image sensor 140.

The CMOS image sensor 140 captures the subject image, which has been produced by the optical system 110, thereby generating an image signal. The CMOS image sensor 140 performs exposure, transfer, electronic shuttering and various other kinds of operations.

An A/D converter 150 converts the analog image signal that has been generated by the CMOS image sensor 140 into digital image data.

The microphone 250 picks up audio and generates an audio signal.

The image/audio processor 160 converts the image signal that has been generated by the CMOS image sensor 140 and the analog audio signal that has been generated by the microphone 250 into digital data. The image/audio processor 160 subjects the image data and the audio data that has been converted into the digital data to various kinds of processing. For example, the image/audio processor 160 may subject the image data to gamma correction, white balance correction, flaw correction and various other sorts of processing. Furthermore, the image/audio processor 160 also compresses the image data in a compression format compliant with the H.264 standard or the MPEG-2 standard. And the image/audio processor 160 generates image data to be displayed on a monitor screen 220 and also generates image data to be stored in the memory card 200.

The image/audio processor 160 also subjects the audio data to noise reduction and various other kinds of processing. For example, the image/audio processor 160 compresses the audio data in a compression format compliant with the MPEG4 Audio standard or the AC3 standard. And the image/audio processor 160 generates audio data to be output through a loudspeaker 260 and also generates audio data to be stored in the memory card 200.

The image/audio processor 160 may be implemented as a DSP or a microcomputer.

The controller 180 is a central processing unit that performs an overall control on all of these components of the digital camcorder 100. The controller 180 may be implemented as a semiconductor device, for example, but could be implemented as either only a single piece of hardware or a combination of hardware and software (i.e., a computer program). For example, the controller 180 could be a microcomputer. By getting a computer program describing the procedure of the processing shown in FIG. 2 (to be described later) executed by the controller 180 that is a computer, the respective components of this digital camcorder 100 operate and the digital camcorder 100 can function as a recorder. On the other hand, by getting a computer program describing the procedure of the processing shown in FIG. 4 (to be described later) executed by the controller 180, the digital camcorder 100 can function as a player.

A buffer 170 functions as a work memory for the image/audio processor 160 and the controller 180, and may be implemented as a DRAM or a ferroelectric memory, for example The memory card 200 can be readily inserted into, or removed from, this digital camcorder 100 through a card slot 190, which an interface (I/F) that is connectible both mechanically and electrically to the memory card 200. The memory card 200 includes a flash memory or a ferroelectric memory inside, and can store data such as an image file that has been generated by the image/audio processor 160.

An internal memory 240 may be a flash memory or a ferroelectric memory, for example, and stores a control program for performing an overall control on this digital camcorder 100 and the computer program described above.

The user interface section 210 is a member for accepting the user's instructions. The user interface section 210 includes, some hardware keys such as cross keys and an ENTER button, or touch screen, to accept the user's instruction, for example.

The monitor screen 220 can display an image represented by the image data that has been generated by the CMOS image sensor 140 (i.e., a through-the-lens image) and an image represented by the image data that has been read from the memory card 200. In addition, the monitor screen 220 can also display various menus for changing the settings of the digital camcorder 100.

And the loudspeaker 260 outputs the audio that has been picked up by the microphone 250 and the audio that has been reproduced based on the audio data stored in the memory card 200.

3. Terminology

The CMOS image sensor 140 is an example of the image signal generator. The microphone 250 is an example of the audio signal generator. The controller 180 and the card slot 190 provide an exemplary arrangement for recording a still picture and/or audio. And the controller 180 also provides a function to play back a still picture and/or audio.

4. Operation

The digital camcorder 100 of this exemplary embodiment has an "IC recorder mode" and an "audio reproducing mode" as its modes of operation.

Specifically, the "IC recorder mode" is a mode of operation in which the digital camcorder 100 functions as a recorder. More specifically, the "IC recorder mode" is a mode of operation, of which the main object is to write, on the memory card 200, the audio data that has been picked up by the microphone 250.

On the other hand, the "audio reproducing mode" is a mode of operation in which the digital camcorder 100 functions as a player. More specifically, the "audio reproducing mode" is a mode of operation in which audio is reproduced based on the audio data that is stored in the memory card 200 and output through the loudspeaker 260.

By turning a mode setting dial, which is included in the user interface section 210, the user can change the modes of operation of this digital camcorder 100 into the IC recorder mode, the audio reproducing mode or any other mode of operation (e.g., a moving picture shooting mode).

In the following description, first of all, it will be described how the digital camcorder 100 operates when set in the IC recorder mode. After that, it will be described how the digital camcorder 100 operates when set in the audio reproducing mode.

4-1. How Digital Camcorder Operates in IC Recorder Mode

Figure 2:
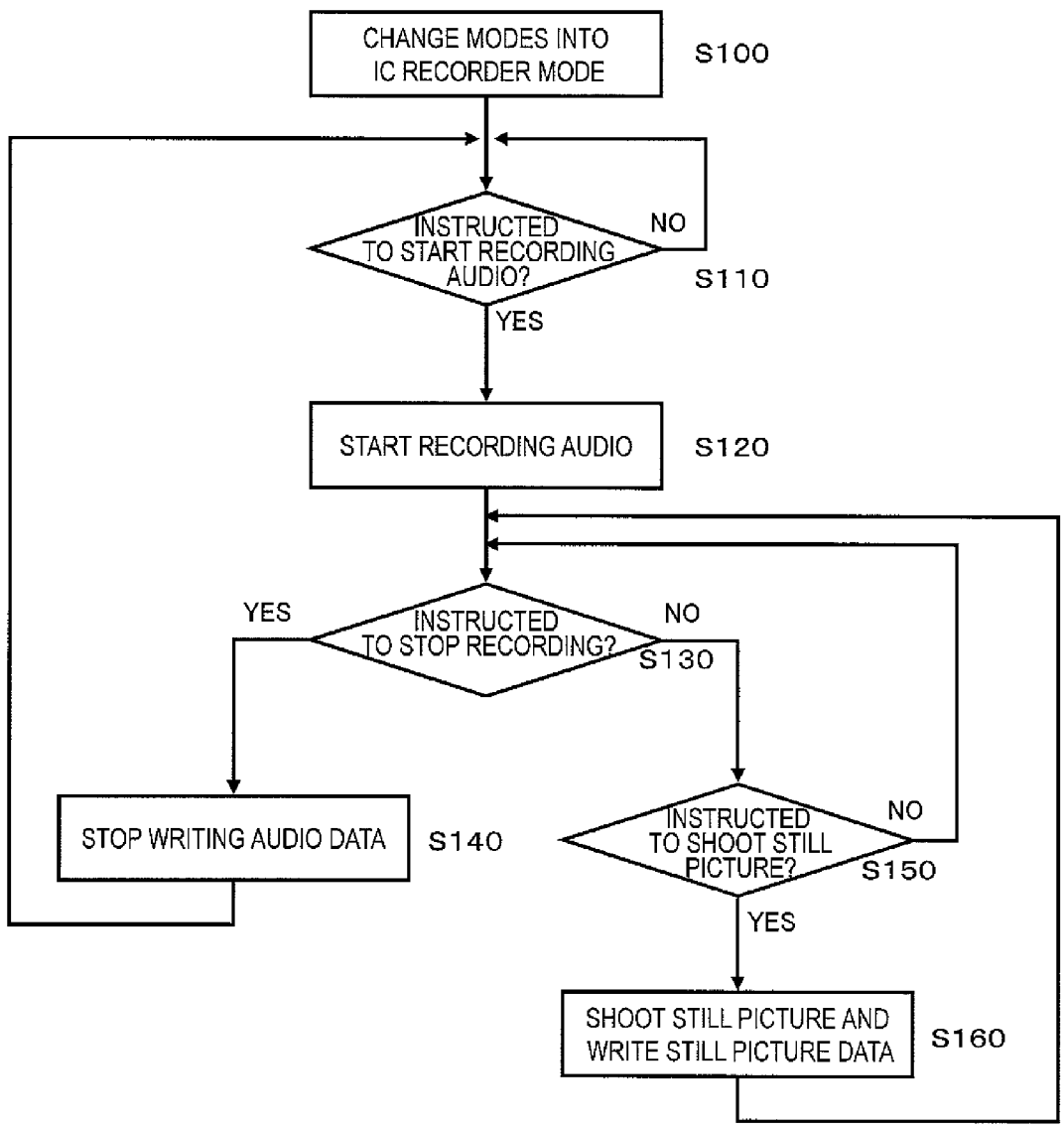
FIG. 2 is a flowchart showing how the digital camcorder 100 operates in an IC recorder mode.

Hereinafter, it will be described with reference to FIGS. 2 and 3 how the digital camcorder 100 operates when set in the IC recorder mode. FIG. 2 is a flowchart showing how the digital camcorder 100 operates in the IC recorder mode. And FIG. 3 schematically shows the directory structure in the memory card 200 on which audio data has been written by the digital camcorder 100.

When the digital camcorder 100 is set in the IC recorder mode (in Step S100), the controller 180 determines whether or not it has accepted a user's instruction to start recording audio (in Step S110). If the answer is YES, the controller 180 starts writing the audio data, which has been generated based on the audio signal that has been picked up by the microphone 250, on the memory card 200 (in Step S120). After that, the controller 180 determines whether or not it has accepted a user's instruction to stop recording the audio (in Step S130).

If the answer is YES, the controller 180 instructs the microphone 250 to stop picking up that audio, thereby stopping writing the audio data (in Step S140).

On the other hand, if the answer to the query of the processing step S130 is NO, then the controller 180 determines whether or not it has accepted the user's instruction to shoot a still picture (in Step S150). If the answer is YES, the controller 180 writes the still picture data, which has been generated based on the image signal that has been captured by the CMOS image sensor 140, on the memory card 200 (in Step S160). It should be noted that the still picture data and the audio data are written on the memory card 200 in parallel with each other.

In this manner, when instructed by the user to shoot a still picture while writing the audio data on the memory card 200, the digital camcorder 100 of this exemplary embodiment starts writing the still picture data on the memory card 200 in parallel with writing the audio data on the memory card 200.

Once the digital camcorder 100 has written the audio data and the still picture data on the memory card 200, the directory shown in FIG. 3 is created in the memory card 200. Each item of those data is stored as a data file.

The file name of each data file typically has a structure consisting of "base name+. (dot)+extension". In FIG. 3, the extension "M4A" indicates that the data file with that extension is an audio file compliant with the MPEG4 Audio standard and the extension "jpg" indicates that the data file with that extension is a still picture file compliant with the JPEG standard.

Also, in FIG. 3, "(2011/2/22/10:00)" shown on the right-hand side of the file name "IMGA0004.M4A" indicates the date and time when the audio file with the file name "IMGA0004.M4A" was written on the memory card 200 (which will be referred to herein as its "recording end time"). It should be noted that (2011/2/22/10:00) is a Japanese way of indicating the date and time that means Feb. 22, 2011 10:00 AM. Likewise, "(2011/2/22/9:50)" shown on the right-hand side of the file name "IMGA0005.jpg" indicates the date and time when the still picture file with the file name "IMGA0005.jpg" was written on the memory card 200 (which will be referred to herein as its "recording time"). The same can be said about the other file names, too.

In the example of this exemplary embodiment shown in FIG. 3, while an audio file with the file name "IMGA0001.M4A" was being written, a still picture file with the file name "IMGA0002.jpg" was written. After that, another audio file with the file name "IMGA0003.M4A" was written. Subsequently, while an audio file with the file name "IMGA0004.M4A" was being written, three still picture files with the file names "IMGA0005.jpg", "IMGA0006.jpg" and "IMGA0007.jpg" were written back to back in this order. It should be noted that each of these file names is compliant with the DCF standard and that its base name includes a piece of information indicating the order of generation or writing of that and the other files (i.e., a serial number).

It should also be noted that the date and time information (which will be referred to herein as "time stamp information") is shown in FIG. 3 just for convenience sake so as to be referred to later in this description. These pieces of time stamp information may be written as file update time information on the file allocation table (FAT) file system on the memory card 200.

As far as the still picture data is concerned, the time when the data write processing was carried out roughly agrees with the time when the data write processing was done. According to this exemplary embodiment, at least information about the time when the file write processing was done should be stored.

In this manner, when the digital camcorder 100 of this exemplary embodiment writes still picture data while writing audio data, the digital camcorder gives a file name, of which the serial number is larger than that of the file name of the audio data being written, to that still picture data. For example, the digital camcorder 100 gives the file name "IMGA0005.jpg" to the still picture data that has been written while audio data with the file name "IMGA0004.M4A" is being written.

In addition, the digital camcorder 100 further writes information about the recording end time of the audio data and information about the recording time of the still picture data on the FAT. As a result, the digital camcorder 100 can decide that still picture data, of which the file name is given a larger serial number than that of the file name of the audio data and of which the recording time is earlier than the recording end time of the audio data, was written while the audio data was being written. This processing is carried out by the controller 180.

That is to say, the controller 180 of the digital camcorder 100 writes audio data and still picture data, which was written while the audio data was being written, in association with each other on the memory card 200 so as to determine, by reference to the file names, the recording end time of the audio data and information about the recording time of the still picture data, what still picture data was written while the audio data was being written.

In this case, the audio data and the still picture data can be associated with each other based on the file name of the audio data. In the example described above, the audio file name IMGA0003.M4A is associated with a still picture file name IMGA000X.jpg (where X is an integer that is greater than three).

Alternatively, a still picture file associated with the audio file with the file name IMGA0003.M4A may also be given a different kind of file name such as IMGA0003n.jpg, where n is an alphanumeric letter to be given in the order of shooting and may have any arbitrary number of digits. If the file name should be compliant with the DCF standard, then appropriate adjustments need to be made.

In any case, if the base name that forms part of a still picture file name includes the same character string that is also included in its associated audio file name, then the associated still picture file name can be detected easily by the file name of audio data.

Furthermore, if the still picture data is compliant with the EXIF standard, then the file name of its associated audio file may also be described in the data field defined by the EXIF standard. Even with such a method adopted, the associated still picture file name can also be detected easily by the file name of audio data.

4-2. How Digital Camcorder Operates in Audio Reproducing Mode

Figure 5A:
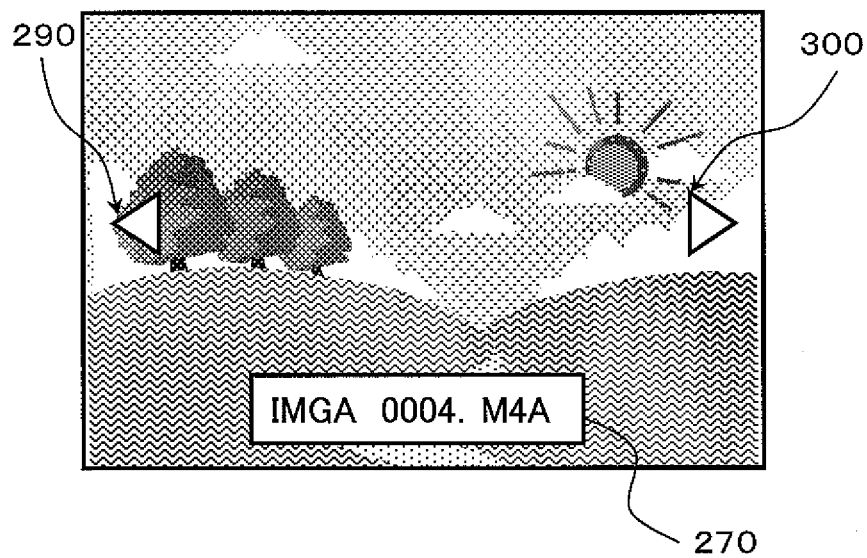
FIGS. 5A and 5B are schematic representations illustrating what pictures may be displayed on a monitor screen 220 in the audio reproducing mode.
Figure 5B:

Next, it will be described with reference to FIGS. 4, 5 and 6 how the digital camcorder 100 operates when set in the audio reproducing mode. FIG. 4 is a flowchart showing how the digital camcorder 100 operates in the audio reproducing mode. FIGS. 5A and 5B are schematic representations illustrating what pictures may be displayed on the monitor screen 220 while audio data is being reproduced. And FIG. 6 is a schematic representation showing exactly how the read operation is carried out in the audio reproducing mode. In FIG. 6, the upper portion shows a relation between the audio and still pictures during recording and the lower portion shows a relation between the audio and still pictures during reproduction.

When the digital camcorder 100 is set in the audio reproducing mode (in Step S200), the controller 180 searches the memory card 200 for the last recorded audio file and starts reproducing audio from that audio file (in Step S210). That is to say, when the modes of operation are changed into the audio reproducing mode, the controller 180 automatically starts reproducing audio from that audio file that has been recorded last time on the memory card 200 and outputs the reproduced audio through the loudspeaker 260. On starting reproducing the audio, the controller 180 determines whether or not still picture data, of which the file name includes a serial number that is greater by one than the one included in the file name of the audio data being reproduced (and which will be referred to herein as "candidate image data"), is stored in the memory card 200 (in Step S220).

If the answer is NO (i.e., if it turns out that there is no such candidate image data stored in the memory card 200), the controller 180 instructs the monitor screen 220 to display predetermined picture (in Step S230). Specifically, the controller 180 instructs the monitor screen 220 to present a black screen as shown in FIG. 5B.

On the other hand, if the answer is YES (i.e., if it turns out that there is such candidate image data stored in the memory card 200), then the controller 180 determines whether or not the recording time of the candidate image data is earlier than the recording end time of the audio data being reproduced now (in Step S240).

If the answer is NO (i.e., if the recording time of the candidate image data turns out to be later than the recording end time of the audio data being reproduced now), then the controller 180 instructs the monitor screen 220 to display a predetermined picture as shown in FIG. 5B (in Step S230).

On the other hand, if the answer is YES (i.e., if the recording time of the candidate image data turns out to be earlier than the recording end time of the audio data being reproduced now), then the controller 180 instructs the monitor screen 220 to display the still picture represented by that candidate image data (in Step S250). Specifically, in that case, the controller 180 instructs the monitor screen 220 to present the picture shown in FIG. 5A. That is to say, on starting reproducing audio, the digital camcorder 100 starts playing back a still picture based on the still picture data that was written while the audio being reproduced now was written. For example, if audio is going to be reproduced from the file "IMGA0004.M4A" with the directory structure shown in FIG. 3 established, the digital camcorder 100 starts playing back still pictures with the file "IMGA0005.jpg" on starting reproducing audio from the file "IMGA0004.M4A" as shown in FIG. 6(*a*).

In FIG. 5A, the indicator 270 indicates the file name of the audio data being reproduced now. The triangular indicator 290 indicates that there is other still picture data, which was written earlier than the still picture data being currently reproduced, in the memory card 200. In other words, the indicator 290 indicates that the memory card 200 stores other still picture data, of which the file name includes a smaller serial number than the file name of the still picture data being currently reproduced. On the other hand, the other triangular indicator 300 indicates that there is other still picture data, which was written later than the still picture data being currently reproduced, in the memory card 200. In other words, the indicator 300 indicates that the memory card 200 stores other still picture data, of which the file name includes a larger serial number than the file name of the still picture data being currently reproduced.

When the still picture represented by the candidate image data is reproduced on the monitor screen 220 in Step S250, the controller 180 determines whether or not the user has given the controller 180 an instruction to change the still pictures to be reproduced on the monitor screen 220 (in Step S260).

If the answer is YES, then the controller 180 may instruct the monitor screen 220 to present a still picture represented by the still picture data, of which the file name includes a serial number that is larger than, but closest to, the one included in the file name of the still picture data being currently reproduced (in Step S270). Or the controller 180 may also instruct the monitor screen 220 to present a still picture represented by the still picture data, of which the file name includes a serial number that is smaller than, but closest to, the one included in the file name of the still picture data being currently reproduced (in Step S270).

In the example illustrated in FIG. 6(*b*), the controller 180 retrieves the still picture file "IMGA0006.jpg" and reproduces a still picture.

That is to say, even if multiple files of still picture data were recorded while the audio data being reproduced now was written, the digital camcorder 100 of this exemplary embodiment never changes automatically the still pictures to be reproduced. It is not until the user instructs the digital camcorder 100 to do so that the digital camcorder 100 changes the still pictures to be reproduced. Also, if the digital camcorder 100 accepts an instruction to change the still pictures to be reproduced while reproducing the audio, the digital camcorder 100 does change the still pictures to be reproduced even if the still picture to be newly reproduced was not written while the audio data being reproduced was being written.

In this manner, if it turns out that in starting reproducing audio data that is stored in the memory card 200, there is still picture data that was written on the same memory card 200 while that audio data was being written there, the digital camcorder 100 of this exemplary embodiment starts to reproduce that still picture data, too. As a result, even if the user does not instruct the digital camcorder 100 to search for any particular still picture data, the digital camcorder 100 can also visually and intuitively remind the user when and where he or she recorded the audio data being reproduced now.

In addition, even if multiple still picture data were written while the audio data being reproduced now was being written, the digital camcorder 100 of this exemplary embodiment never changes automatically the still pictures to be reproduced. As a result, the user can take time to check out the still picture he or she'd like to view at that moment.

On top of that, if the digital camcorder 100 accepts an instruction to change the still pictures to be reproduced while reproducing the audio, the digital camcorder 100 changes the still pictures to be reproduced even if the still picture to be newly reproduced was not written while the audio data being reproduced was being written. As a result, while the audio data is being reproduced, the user can also check out even a still picture that had already been recorded before that audio data started to be written.

It should be noted that the series of processing steps shown in FIG. 4 ends either when the audio has been reproduced till the end or when the user enters an instruction to stop reproducing the audio. In the latter case, the audio may stop being reproduced by starting interrupt processing in accordance with the instruction that has been entered.

As can be seen easily from the foregoing description, in the digital camcorder 100 operating in the audio reproducing mode, its audio recording and video recording (i.e., shooting) functions are disabled. That is why any device that ever has a function and components that contribute to carrying out the audio reproducing done, i.e., any player, can perform the processing described above.

Figure 7A:
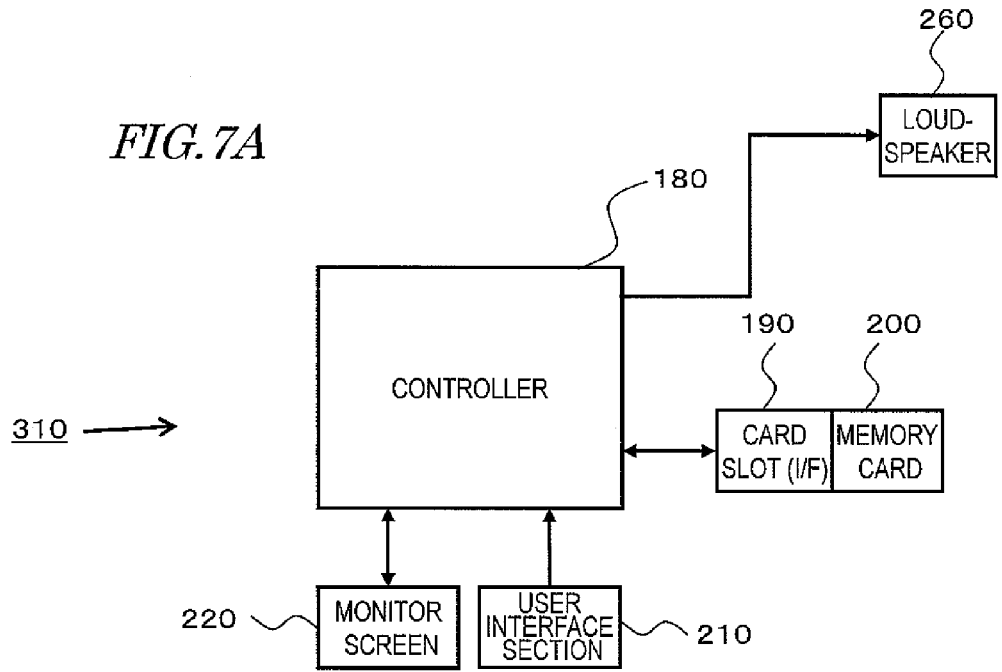
FIG. 7A is a block diagram illustrating a configuration for a player 310.

FIG. 7A illustrates a configuration for a player 310 as an exemplary embodiment of the present disclosure. This player 310 basically has every component of the digital camcorder 100 shown in FIG. 1 except its components contributing to recording audio and video (shooting). Although the player 310 shown in FIG. 7A includes the monitor screen 220 and the loudspeaker 260, this is just an example of the present disclosure. Alternatively, one or both of the monitor screen 220 and the loudspeaker 260 may be omitted.

Figure 7B:
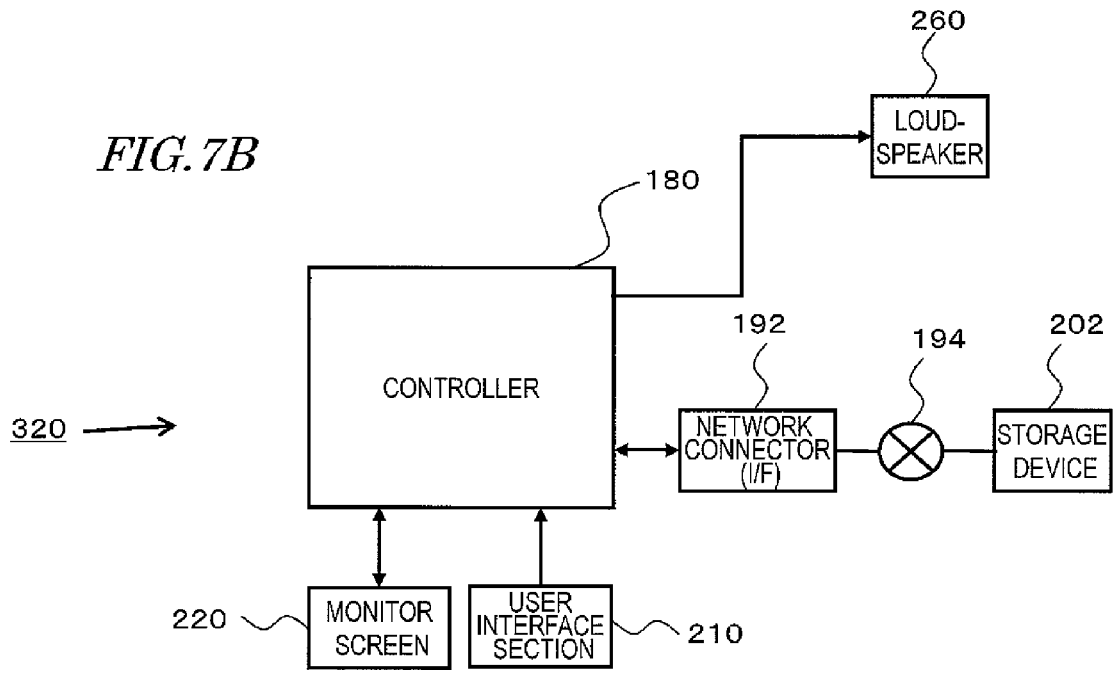
FIG. 7B is a block diagram illustrating a configuration for a player 320.

FIG. 7B illustrates a player 320 that gets audio files and still picture files through a network 194 as another embodiment of the present disclosure.

In FIG. 7B, a storage device 202 is connected to the network 194 and stores audio files and still picture files that have been generated in advance. The network connector (network interface) 192 of the player 320 may get those audio files and still picture files through the network 194 and then reproduce audio and present pictures following the procedure shown in FIG. 4.

Optionally, the player 320 may include a memory card slot 190.

Although the present disclosure has been described by way of illustrative exemplary embodiments, those exemplary embodiments are only examples of the present disclosure and may be readily modified. Following are some of those modifications.

In the embodiment of the present disclosure described above, the imager is supposed to be the CMOS image sensor 140. However, the present disclosure is in no way limited to that specific exemplary embodiment. Alternatively, the imager may also be a CCD image sensor or an NMOS image sensor.

Also, the image/audio processor 160 and the controller 180 may be implemented as either a single semiconductor chip or two different semiconductor chips.

Furthermore, in the embodiments of the present disclosure described above, if it turns out that no still picture data was written while the audio data being currently reproduced was being written, the monitor screen 220 is supposed to present a black screen while the audio data is being reproduced. However, this is just an example of the present disclosure and the black screen does not have to be presented in such a situation. Alternatively, a picture with a preselected pattern may be displayed instead. Or a picture represented by another still picture data that was not written while that audio data was being written may also be presented.

Furthermore, in the embodiments of the present disclosure described above, the digital camcorder 100 is supposed to write not only audio data but also still picture data, which has been captured while picking up the audio data, on the memory card 200. However, this is only an example of the present disclosure, and the memory card 200 is not the only storage medium that can be used in the present disclosure. For example, the digital camcorder 100 may store the audio data and the still picture data on a hard disk drive (storage device) on the network.

Optionally, the digital camcorder 100 may also get audio data and still picture data from any storage medium other the memory card 200, e.g., a storage device on the network, and may reproduce the audio and still pictures. In that case, data is acquired through a network interface instead of the card slot 190.

The present disclosure can be used effectively in digital camcorders, digital cameras, cellphones with camera, and other image capture devices.

While the present disclosure has been described with respect to embodiments thereof, it will be apparent to those skilled in the art that the disclosed embodiments may be modified in numerous ways and may assume many other embodiments other than those specifically described above. Accordingly, it is intended by the appended claims to cover all modifications of the disclosure that fall within the true spirit and scope of the disclosure.

This application is based on Japanese Patent Applications No. 2011-067246 filed on Mar. 25, 2011 and No. 2012-060995 filed on Mar. 16, 2012, the entire contents of which are hereby incorporated by reference.

What is claimed is:

1. A player comprising:
   an interface configured to retrieve an audio file from a storage medium on which the audio file and a still picture file are stored;
   a controller configured to retrieve a still picture file, which is selected by the file name of the audio file, from the storage medium and configured to reproduce audio and a still picture from the audio file and the still picture file, respectively; and
   a user interface section that accepts a user's instruction to change the still pictures to be reproduced;
   wherein:
   the controller retrieves, from the storage medium, a still picture file that was generated while the audio file was being generated;
   the controller continues to reproduce the same first still picture until the controller receives the instruction to change via the user interface section;
   when receiving the instruction to change from the user via the user interface while reproducing the audio, the controller reproduces a second still picture distinct from the first still picture; and
   a second still picture file representing the second still picture is generated earlier or later than a first still picture file representing the first still picture and is generated at the time closest to the time when the first still picture file is generated.

2. The player of claim 1, wherein the controller reproduces the second still picture independent of whether the still picture file of the second still picture was generated while the audio file was being recorded.

3. The player of claim 1, wherein if information indicating the order of recording has been added to the base name of a file that has been written on the storage medium and if a file system that allows the user to find the recording end time of the file is established on the storage medium,
   the controller determines, by reference to the information and the recording end time of the audio file, what still picture file was recorded before the recording end time of the audio file.

4. The player of claim 1, wherein if a file system that allows the user to find the recording end time of a file is established on the storage medium,
   the controller retrieves, from the storage medium, a still picture file which was recorded before the recording end time of the audio file and of which the file name includes a part of the base name of the audio file.

5. The player of claim 1, wherein the storage medium is a memory card.

6. The player of claim 1, wherein the storage medium is a storage device that is connected to a network, and
   wherein the interface retrieves the audio file and the still picture file from the storage device.

7. The player of claim 1, further comprising:
   a loudspeaker configured to output the audio; and
   a monitor screen configured to present the still picture.

8. The player of claim 1, further comprising at least one of an audio signal generator configured to generate an audio signal and an image signal generator configured to generate an image signal representing a still picture.

* * * * *